United States Patent [19]

Cobb et al.

[11] Patent Number: 5,404,247
[45] Date of Patent: Apr. 4, 1995

[54] TELECENTRIC AND ACHROMATIC F-THETA SCAN LENS SYSTEM AND METHOD OF USE

[75] Inventors: Joshua M. Cobb, Millbrook; Mark J. LaPlante, Walden; David C. Long, Wappingers Falls; Franz Topolovec, Accord, all of N.Y.

[73] Assignee: International Business Machines Corporation, Armonk, N.Y.

[21] Appl. No.: 100,844

[22] Filed: Aug. 2, 1993

[51] Int. Cl.⁶ .......................... G02B 13/22; G02B 9/64
[52] U.S. Cl. .................................... 359/662; 359/663; 359/755
[58] Field of Search ............... 359/662, 663, 754, 755, 359/764

[56] References Cited

U.S. PATENT DOCUMENTS

| | | | |
|---|---|---|---|
| 3,902,036 | 8/1975 | Zaleckas | 219/121 L |
| 4,269,478 | 5/1981 | Maeda et al. | 359/764 |
| 4,396,254 | 8/1983 | Shibuya | 359/662 |
| 4,863,250 | 9/1989 | Ishizuka | 359/662 |
| 4,880,299 | 11/1989 | Hamada | 359/662 |
| 4,925,279 | 5/1990 | Shirota | 359/662 |
| 5,055,663 | 10/1991 | Morimoto et al. | 359/662 |
| 5,087,987 | 2/1992 | Simbal | 359/663 |
| 5,134,523 | 7/1992 | Cobb | 359/676 |
| 5,168,454 | 12/1992 | LaPlante et al. | 364/474.08 |

Primary Examiner—Scott J. Sugarman
Attorney, Agent, or Firm—Aziz M. Ahsan

[57] ABSTRACT

An airspaced, diffraction limited, seven element telecentric f-theta lens having a first meniscus lens concave to the incident side; a first bi-concave lens; a second meniscus lens convex to the incident side; a third meniscus lens concave to the incident side; a pair of bi-convex lenses; and a second bi-concave lens is disclosed. The second, third and fourth as well as the sixth and seventh lens elements are edge contact spaced.

16 Claims, 5 Drawing Sheets

TANGENTIAL

FIG. 3B

TANGENTIAL

FIG. 3C

TANGENTIAL

FIG. 3D

TANGENTIAL

FIG. 3E

SAGITTAL

FIG. 3F

SAGITTAL

FIG. 3G

SAGITTAL

FIG. 4A

TANGENTIAL

FIG. 4B

TANGENTIAL

FIG. 4C

TANGENTIAL

FIG. 4D

TANGENTIAL

FIG. 4E

SAGITTAL

FIG. 4F

SAGITTAL

FIG. 4G

SAGITTAL

Figure 1:
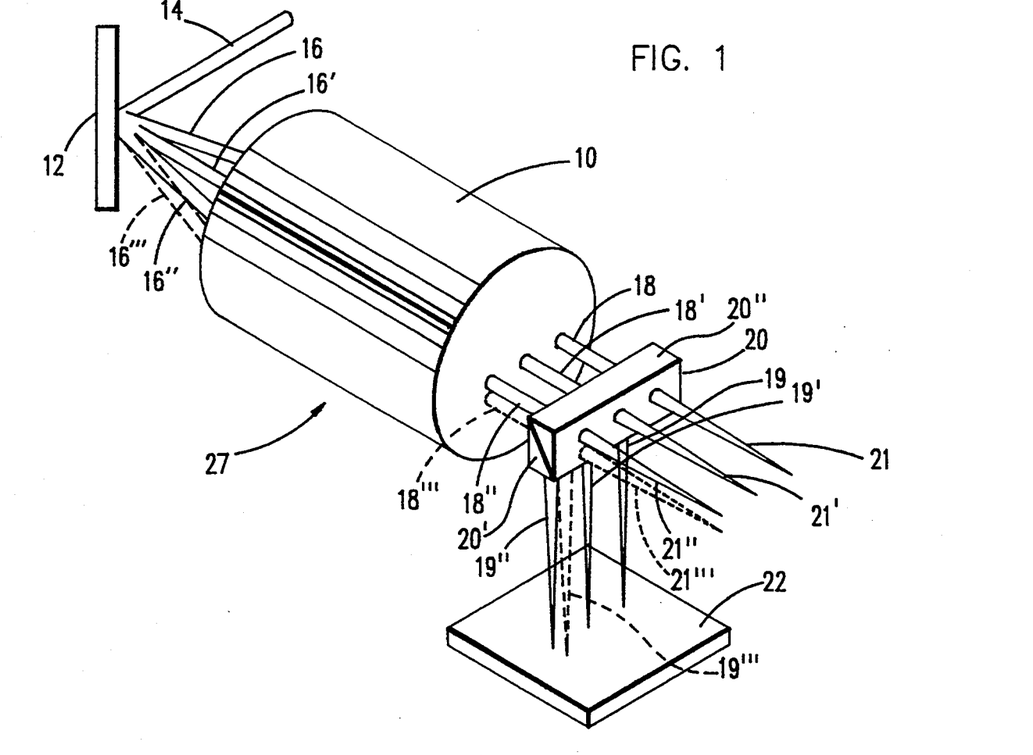
FIG. 1 schematically illustrates the lens system with a galvonometer mirror for scanning and the light beams diverted or folded by a beam splitter to impinge on an image plane or ceramic green sheet.

FIG. 8 ive color corrected lens system 27 consisting of the lens 10 and beam splitter 20, as observed in FIG. 1, is positioned following a galvonometer scanning mirror 12 or other scanning means. Galvonometer mirror 12 is electronically controlled and oscillates to scan coaxial incoming laser beams 14 through the range of positions indicated as 16, 16' and 16" extending to

TELECENTRIC AND ACHROMATIC F-THETA SCAN LENS SYSTEM AND METHOD OF USE

FIELD OF THE INVENTION

This invention relates to optical lenses and more specifically to telecentric lenses to be used with laser light of two or more different wavelengths; where a scanned incident beam of two or more different wavelengths is scanned across an image plane and the central ray of the focusing bundle of rays exiting the lens is parallel to the lens axis and, accordingly, the ray also is perpendicular to the image plane. The combined beam may be split to divert a first wavelength; the second wavelength beam may be used to provide positional data for control of the first wavelength beam, and also provide verification of work.

BACKGROUND OF THE INVENTION

It is known that lasers can drill or burn very small holes at precise locations in sheets of material. These characteristics can be used, for example, for the formation of holes in ceramic green sheets, which are thin layers of unfired ceramic material which form the structural basis for electronic modules. The holes in the ceramic green sheets are used to form via paths from one surface to the other for electrical interconnections between adjacent green sheets. Sometimes it is necessary to align a hole extending through a plurality of such sheets in order to provide an electrically conductive path from one sheet to a sheet which is displaced by several sheets and sheet thicknesses from the first sheet. To accomplish this assembly, the holes must be perpendicular to the green sheet surface and must be accurate to a very high degree, such as to within approximately 5 um in location on the green sheet. These requirements are dictated by the fact that the holes must accurately align with similar holes on adjacent sheets. The telecentricity of the lens also helps to minimize the magnification shift with respect to shifts in focal plane. The location of the holes on the green sheets may be controlled by a system such as disclosed in U.S. Pat. No. 5,168,454, issued to Mark J. LaPlante, et al., and assigned to the International Business Machines Corporation, the disclosure of which is incorporated herein by reference. The lens disclosed in the LaPlante, et al. patent is a flat field lens. The LaPlante, et al. system may be substantially improved by the use of a telecentric lens such as the subject of this invention. As discussed in LaPlante, et al., the materials processed by the lens in this patent are not limited to green sheets.

SUMMARY OF THE INVENTION

The telecentric lens of this invention utilizes seven air-spaced lens elements in order, progressing from the incident side of the lens assembly: a meniscus lens element concave to the incident side; a bi-concave lens element; a meniscus lens element convex to the incident side; a meniscus lens element concave to the incident side; two bi-convex lens elements and a bi-concave lens element. All lens elements are air-spaced; additionally, lens elements L2, L3 and L4 and lens elements L6 and L7, in order, are positioned in edge contact with the adjacent enumerated lens elements. The lens assembly is an F10 aperture lens and has a 248.948 millimeter calibrated focal length with telecentricity of better than six minutes of arc. By appropriate selection of lens materials, the lens assembly is color corrected for selected wavelengths of light corresponding to the wavelengths of light emitted by the lasers that are used in the system, such as the system of LaPlante, et al. The color corrections allow use of an argon laser and a frequency doubled YAG laser; the frequency doubled YAG laser performs the cutting while the argon laser beam is used for positional control. The argon beam is preferably used to verify machined features by splitting it at the beam splitter and sending the YAG part of it to impinge on the work surface and this beam may be detected in reflection or transmission by opto-electronic detectors to verify the features of the work piece while the remaining portion of the laser beam is incident upon the tracking mechanism.

Figure 2:
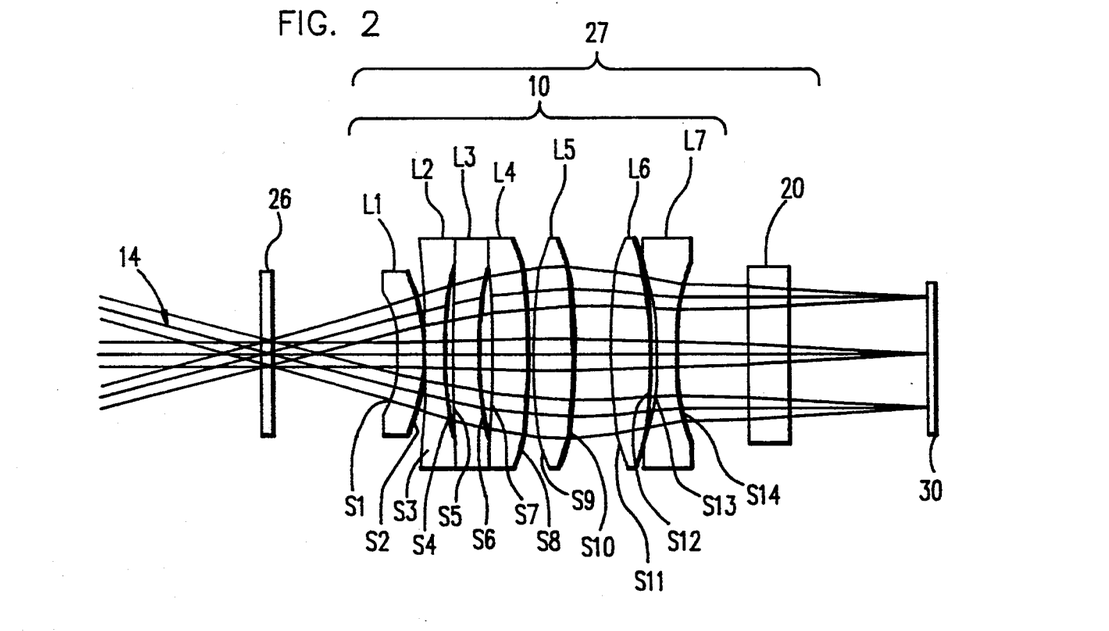
FIG. 2 illustrates a telecentric lens system, color corrected through the range of wavelengths from approximately 488 nm to approximately 543.5 nm.
Figure 3A:
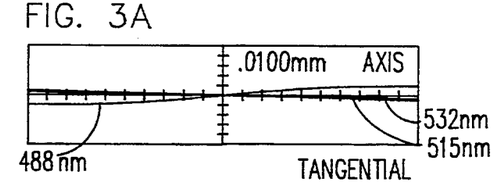
FIGS. 3A through 3G are transverse ray aberration plots showing the transverse ray aberrations for wavelengths of 532 nm, 515 nm and 488 nm.
Figure 3B:
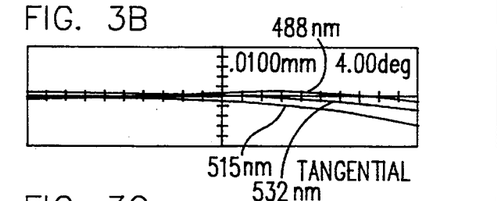
Figure 3C:
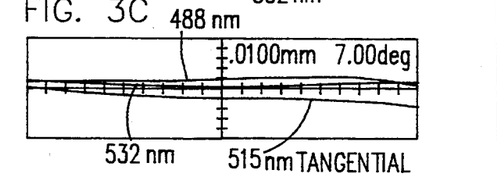
Figure 3D:
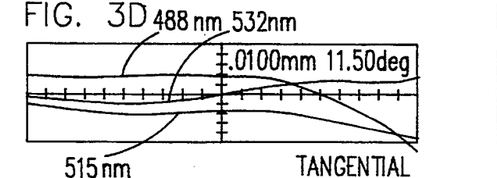
Figure 3E:
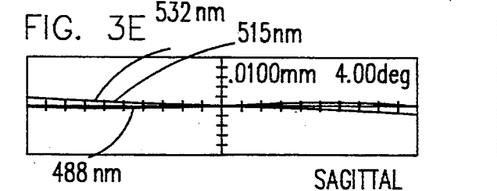
Figure 3F:
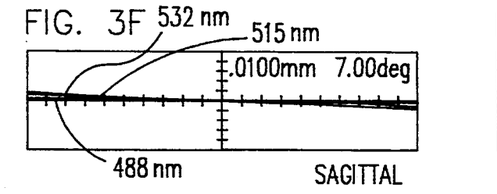
Figure 3G:
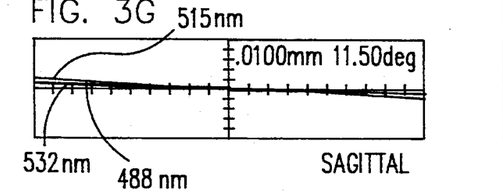
Figure 4A:
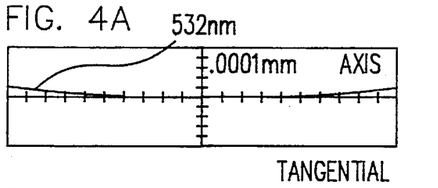
FIGS. 4A through 4G are optical path difference plots for a 532 nm wavelength light.
Figure 4B:
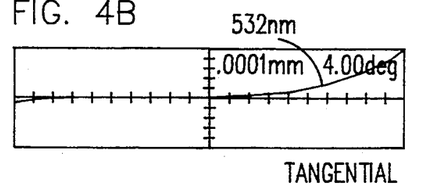
Figure 4C:
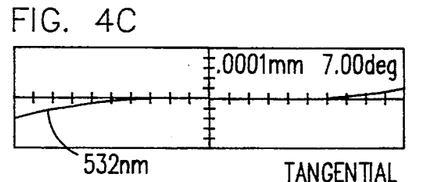
Figure 4D:
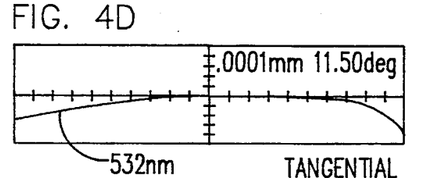
Figure 4E:
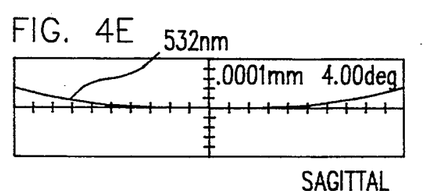
Figure 4F:
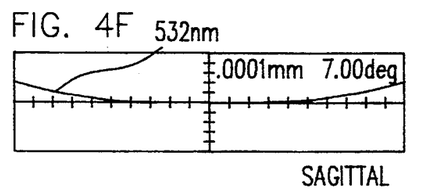
Figure 4G:
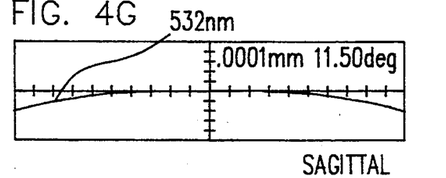
Figure 5A:
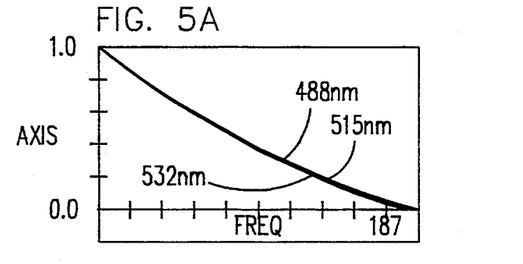
FIGS. 5A through 5G are diffraction MTF plots for 532 nm, 515 nm and 488 nm wavelength light.
Figures 5B, 5E:
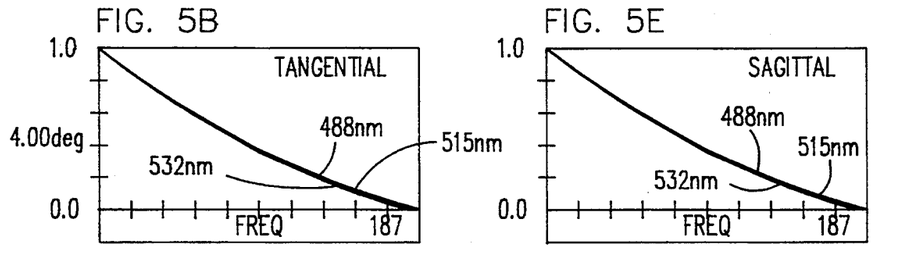
Figures 5C, 5F:
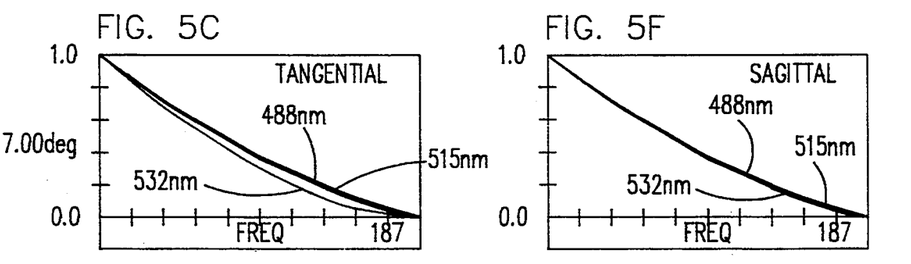
Figures 5D, 5G:
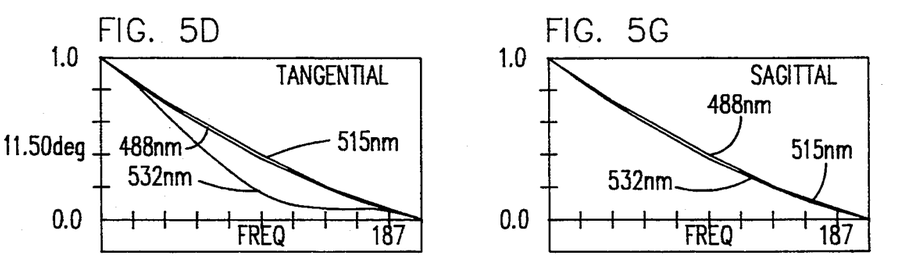

Detailed Description Of The Preferred Embodiment Of The Best Mode Contemplated By The Inventors For Carrying Out The Invention The telecentric color corrected lens system 27 consisting of the lens 10 and beam splitter 20, as observed in FIG. 1, is positioned following a galvonometer scanning mirror 12 or other scanning means. Galvonometer mirror 12 is electronically controlled and oscillates to scan coaxial incoming laser beams 14 through the range of positions indicated as 16, 16' and 16" extending to various regions of the first lens L1 element of scan lens 10, as shown in FIG. 2.

The laser beam 14 is produced by combining the beams of a frequency doubled YAG laser and an Argon ion laser which produces either blue or green light. The two beams are aligned to provide a single incoming laser beam 14.

A frequency doubled YAG laser is a solid state laser using Yttrium-Aluminum-Garnet as the matrix material doped with Neodymium. The frequency is doubled by using a frequency doubling crystal. Such a laser may be procured from Coherent, Inc., Palo Alto, Calif.

The telecentric characteristics of scan lens 10 causes the range of light beams 16, 16', 16" to exit from the image side of the scan lens 10 at positions indicated as beams 18, 18' and 18". The beams 18, 18' and 18" are all arranged to impinge onto the first surface of a beam splitter 20 which will fold the frequency doubled YAG laser beam to impinge the beam 19, 19', 19" on the surface of the part 22 or work piece 22 such as green sheet 22. The beam splitter 20 may be fabricated so that the blue or green Argon ion laser component 21, 21', 21" incorporated into the incoming laser beam 14 together with a frequency doubled YAG laser light can be split or partially split out and continues parallel to the axis of scan lens 10 to impinge on a control grid (not shown) or other light sensitive apparatus for use as a reference, or beam tracking apparatus.

The beam splitter 20 may be fabricated out of two sections of precisely controlled and dimensioned glass 20' and 20", of the BK7 type. One of the segments of glass 20' or 20" may be coated with a material to selectively pass or partially pass the Argon green and Argon blue light wavelengths while reflecting the frequency doubled YAG laser wavelength to the work piece 20. The second segment of the glass 20' or 20" then may be cemented to the first section such that the bases of the triangles are cemented in face-to-face relationship as shown. Thus the light beams 18, 18' and 18" will be split with the frequency doubled YAG laser light component beams 19, 19', 19" being focused on the part or green sheet 22 with at least a portion of the argon laser light component beams 21, 21', 21" passing directly through the beam splitter 20 to focus on the control grid.

The scan lens 10 is designed to work with 40 mm thick plate of BK7 glass or other optical materials which provides the equivalent optical path length. This BK7 glass can take the form of a beam splitter 20, a window, or combination of both providing the total thickness is 40 mm and the faces of the glass are flat and parallel. The lens 10 must be designed to accommodate the thickness of the beam splitter 20 since the beam splitter 20 affects the aberrations of the lens system 27.

Referring now to FIG. 2, the lens or optical elements L1-L7 of the scan lens 10 are illustrated along with the beam splitter 20. Incident rays of light 14 from the lasers pass through a point illustrated as a pupil 26 but which is in fact the surface of the galvonometer mirror 12, as shown in FIG. 1. The galvonometer mirror 12 scans the laser beams 14, to varying locations on the incident end of scan lens 10 with a corresponding shift of the image spot on the image plane 30.

Scan lens 10 is comprised of lens L1, a meniscus lens which is concave to the incident side. Lens element L2 is a bi-concave lens element. Lens element L3 is a meniscus lens which is convex to the incident side. Lens L4 is a meniscus lens which is concave to the incident side. Both lens elements L5 and L6 are bi-convex lens elements. The last lens element L7 in the scan lens 10 is a bi-concave lens element. Lenses L6 and L7 form an airspaced doublet made of crown and flint glasses respectively. The lens element surfaces, designated by S1 through S14 have radii of the surfaces of the lens elements and these radii are expressed in negative and positive notation, as is customary; a positive radius indicates the center of the radius is located to the right of the lens surface while a negative radius has the radius center located to the left of the lens surface.

The laser beams 14 are not only scanned as a function of the scan angle, but the laser beams 14 also are focused to a diameter of approximately 12 microns which is the diffraction limited spot size for this optical system 27 at the image plane 30. The composite incoming laser beam 14 is focused so that after being split into beams 19, 19', 19" and 21, 21', 21", the light is precisely concentrated in a 12 micron spot for precise position detection of the Argon ion laser beam and for providing a sufficient energy concentration to drill or cut the work piece 22.

The materials from which the lens elements L1-L7 and beam splitter 20 are fabricated act to color correct the scan lens system 27 so that throughout the wavelength range encompassing the three wavelengths of light, 532 nm, 514.5 nm and 488 nm, all will be scanned and focused in substantially identical fashion. The range of wavelengths from 488 nm through 543.2 nm includes light produced from commonly known lasers including Argon-Ion, Copper Vapor, frequency doubled YAG and Green Helium-Neon.

The broad band color correction of this lens system 27 makes it practical and feasible to separate the high power burning beam from the low power tracking beam. Since the YAG component of laser beam 14 is approximately 250,000,000 times as powerful as the Argon ion component the beam splitter is coated with a coating which reflects the YAG component, effectively filtering out the YAG component from the Argon ion component. This delivers the high power of the YAG component to the work piece 22 while not damaging the surface upon which the Argon ion component impinges. Accordingly, sensitive light detection devices may then be used with the Argon ion component for control and tracking of the YAG component relative to the work piece 22, since the two components have nearly identical optical paths through the scan lens 10 and are only separated at the beam splitter 20.

The precise dimensioning of the surfaces of the respective lens elements L1-L7 and their placement and spacing with respect to each other may be best described by the data in Table I. The column labeled "Lens #" indicates each lens element in accord with the designations in FIG. 2; while the column headed "Surface #" is designated by the letter S, followed by a number from 1 to 14 indicating the lens surface. For example, lens L1 has surfaces S1 and S2. The column designated "Radius" is the radius of curvature of the respective surface as expressed in millimeters.

The column designated "SEPN" is the separation distance between lens elements or the separation between surfaces of a lens element, thus the thickness of each of the lens elements L1-L7. The separation distance is expressed in millimeters along the axis of the scan lens 10.

The column headed "CLR.DIAM." indicates the clear diameter of the lens elements L1-L7, in millimeters. The preferred materials for the lenses L1-L7 are indicated under the column headed "Material" using material names from Schott Glass Technologies' Glass Catalogue. The specification of the material dictates the index of refraction and the Abbe' V number; therefore, the Abbe' V values are not included in the tables as they would be redundant. The spaces between the lens elements L1-L7 are indicated as air.

TABLE I

| LENS # | SURFACE # | RADIUS— MM | SEPN— MM | CLR. DIAM.— MM | MATE— RIAL |
|---|---|---|---|---|---|
| | S1 | −98.600 | | 90.00 | |
| L1 | | | 20.000 | | F5 |
| | S2 | −173.440 | | 120.00 | |
| | | | 0.500 | | AIR |
| | S3 | −4068.600 | | 180.00 | |
| L2 | | | 15.000 | | PSK52 |
| | S4 | 442.180 | | 160.00 | |

TABLE I-continued

| LENS # | SURFACE # | RADIUS—MM | SEPN—MM | CLR. DIAM.—MM | MATERIAL |
|---|---|---|---|---|---|
|  |  |  | 6.000 |  | AIR |
|  | S5 | 2384.400 |  | 180.00 |  |
| L3 |  |  | 22.000 |  | BAF4 |
|  | S6 | 315.700 |  | 137.70 |  |
|  |  |  | 10.000 |  | AIR |
|  | S7 | −989.380 |  | 137.70 |  |
| L4 |  |  | 30.000 |  | LAK8 |
|  | S8 | −233.540 |  | 180.00 |  |
|  |  |  | 2.500 |  | AIR |
|  | S9 | 282.210 |  | 180.00 |  |
| L5 |  |  | 40.000 |  | LAK8 |
|  | S10 | −233.540 |  | 180.00 |  |
|  |  |  | 21.690 |  | AIR |
|  | S11 | 289.870 |  | 180.00 |  |
| L6 |  |  | 40.000 |  | LAK8 |
|  | S12 | −289.870 |  | 180.00 |  |
|  |  |  | 2.500 |  | AIR |
|  | S13 | −233.540 |  | 150.00 |  |
| L7 |  |  | 20.000 |  | SF1 |
|  | S14 | 205.980 |  | 150.00 |  |

The above scan lens 10, with elements L1–L7 arranged as indicated and used in conjunction with beam splitter 20 will produce a telecentric lens system 27 with the following highly desirable characteristics, apparent to those skilled in the art of optical design:

Effective Focal Length 250 mm,
Color Corrected For A Range of WaveLengths between approximately 488 nm and 543.5 nm,
Telecentricity <6 minutes of arc,
Numerical Aperature =0.05=F/10,
Color Magnification Difference:
  <3 microns deviation between the relative spot locations on the image plane for spots of Argon Blue and frequency doubled YAG light,
  <5 microns deviation between the relative spot locations on the image plane for spots of Argon Green and frequency doubled YAG light,
Calibrated Focal Length =248,948 mm,
Total Scan Length=100 mm,
Overall Lens Center Thickness=230.2 mm,
Scan Angle=±/−11.5 degrees.
Diffraction Limited Image Quality Over The Scan Angle and Wavelength Range.

The deviation between the relative spot locations of the light spots of different wavelengths of light is a result of the lack of ability of the scan lens system 27 to precisely position spots of light of differing wavelengths at identical locations. Thus the deviation between the colors of light is a measure of the accuracy in placing light spots of one color precisely with respect to a spot of another color. Accordingly, this deviation may need to be considered in the calibration of the system in which the lens is used. The smaller the deviation, the greater the lens quality, with regard to color correction.

Table II is a tabulation of the theoretical image height for an f-theta lens and the actual image height of the focus point in millimeters of the beam on the focal plane of the lens, as a function of the scan angle, where a ray is scanned from a galvonometer mirror. The mirror is located 148.500 mm in front of surface S1 and with scan angles from 0.5 degree to 11.5 degrees.

Table II also includes a column for the absolute error in microns,s that being absolute difference between the f-theta theoretical image height and the actual image height. Table II further has a column for percent error which is the relation of the absolute error to the f-theta theoretical image height.

TABLE II

SCAN LENS DATA

| ANGLE (DEGREES) | f-theta THEORETICAL IMAGE HEIGHT | ACTUAL IMAGE HEIGHT | ABSOLUTE ERROR IN MICRONS | PERCENT ERROR |
|---|---|---|---|---|
| 0.5 | 2.17248 | 2.18168 | 9.2 | 0.42% |
| 1.5 | 6.51744 | 6.54461 | 27.2 | 0.41% |
| 2.5 | 10.86241 | 10.90620 | 43.8 | 0.40% |
| 3.5 | 15.20737 | 15.26558 | 58.2 | 0.38% |
| 4.5 | 19.55233 | 19.62186 | 69.5 | 0.36% |
| 5.5 | 23.89729 | 23.97413 | 76.8 | 0.32% |
| 6.5 | 28.24226 | 28.32145 | 79.2 | 0.28% |
| 7.5 | 32.58722 | 32.66277 | 75.5 | 0.23% |
| 8.5 | 36.93218 | 36.99684 | 64.7 | 0.18% |
| 9.5 | 41.27714 | 41.32209 | 44.9 | 0.11% |
| 10.5 | 45.62210 | 45.63639 | 14.3 | 0.03% |
| 11.5 | 49.96707 | 49.93677 | −30.3 | −0.06% |

Figure 6:
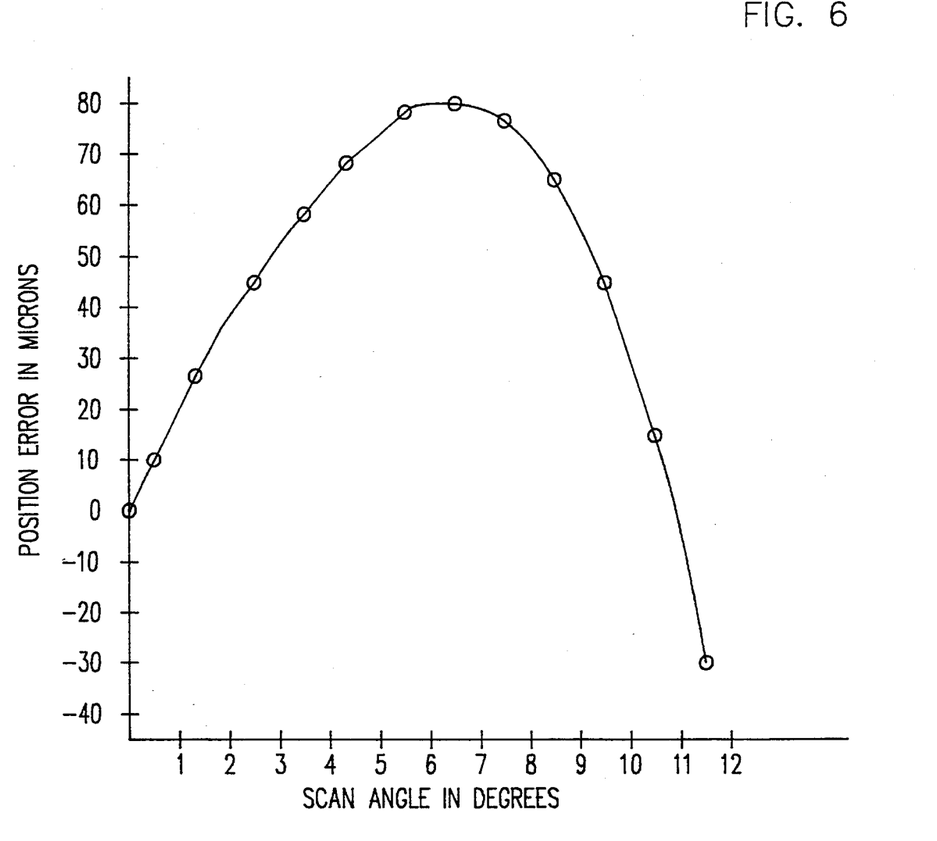
FIG. 6 is a plot of the position error from the theoretical f-theta position for the 250 millimeter laser scan lens versus the scan angle.
Figure 7:
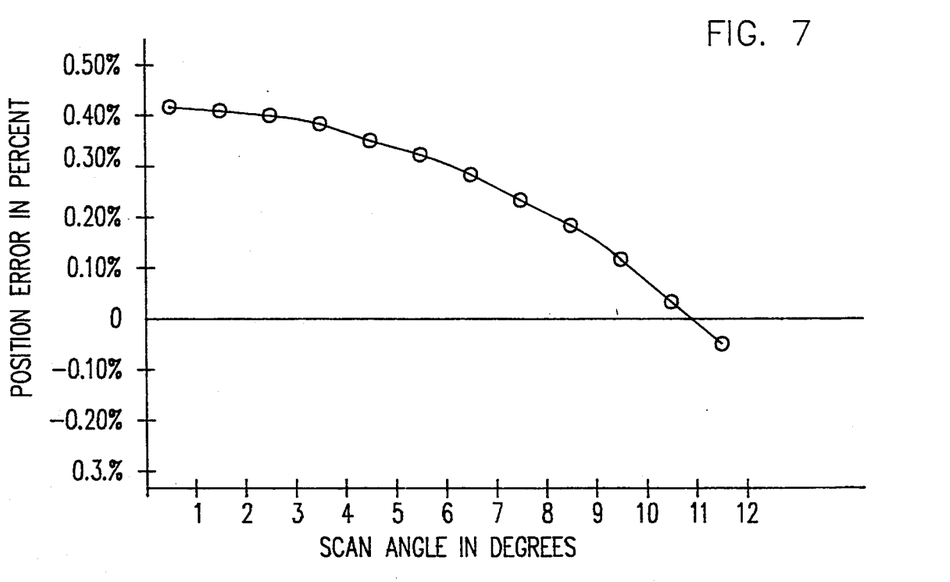
FIG. 7 is a plot of the position error, expressed as a percentage of the theoretical f-theta height, versus the scan angle.

To visually appreciate the significance of the position error and percent error, these two values are plotted against scan angle in FIGS. 6 and 7.

The image produced by the above scan lens system 27 is diffraction limited over the range of scan angles and wavelengths noted above.

FIG. 2 shows edge contacting surfaces of lens elements, L2, L3 and L4 as well as lens elements L6 and L7. The elements are in edge contact with the adjacent lens elements. This edge contact results in spacing of the lens surfaces which is both extremely accurate and reliable.

FIGS. 3A through 3G, 4A through 4G, and 5A through 5G graphically illustrate the performance of the lens system 27, to those of skill in the art of optics, in terms of transverse ray aberrations, optical path differences and diffraction modulation transfer function. The designations Tangential and Sagittal indicate the performance plot of the lens for rays of light that are located in the Tangential and Sagittal planes. The Tangential and Sagittal planes are orthogonal planes, the intersection thereof being coincident with the lens axis.

Figure 8:
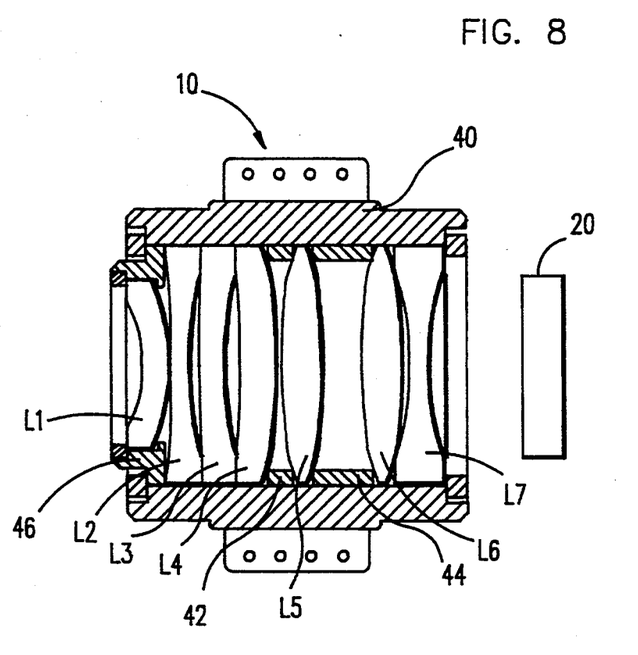
FIG. 8 is a sectional view of one embodiment of the lens assembly and housing of this invention.

The significance of the edge contact between lens surfaces S4 and S5, S6 and S7, and S12 and S13 is that the lens elements are spaced based upon the radii of curvature and fabrication parameters of the lens elements L2, L3, L4, L6 and L7, thereby eliminating the need to provide spacing rings between those respective surfaces. The elimination of spacing rings in the lens housing 40 reduces tolerance accumulation and tolerance error and, accordingly, makes the scan lens 10 more precise.

As can be seen in FIG. 8, lens housing 40 still requires a pair of spacing rings 42 and 44 between lens L4 and L5 and between L5 and L6, respectively. Additionally, due to the shape and clear diameter of lens L1, it is necessary to provide a mounting ring 46 to support the lens element L1 with respect to lens element L2.

The lens housing 40 is typically comprised of stainless steel to more closely match the coefficients of thermal expansion of the lens elements thereby maintaining the appropriate positions of the lens elements.

Scan lens system 27 is color corrected for the range of wavelengths of light, from the light of blue and green ARGON-ION lasers through the wavelength of a frequency doubled YAG laser. The frequency doubled YAG laser light provides the cutting capability while the blue or green Argon ion laser light may be split from the combined beam and used for position control and inspection. The blue or green Argon light beam may be split from the combined beam, and impinge on a secondary image plane (not shown) such as a position detector, to provide firing control of the frequency doubled YAG laser beam on the part or work piece or green sheet 22. The color correction of the scan lens system 27 is essential so that there is a high degree of correlation between the positions of the two beams exiting the beam splitter 20, and also allows optical filters to be able to separate the different wavelength beams.

The lens elements L1-L7 and the faces of the beam splitter 20 are suitably coated for anti-reflection for desired wavelengths to enhance performance. The beam splitter 20 described above may be replaced, if desired, with a window or windows of suitable glass with a total optical path length as indicated equivalent to 40 mm of BK7 glass. This would be desirable in the event that two or more beams are not split.

FIG. 1 shows the galvonometer 12 scanning the laser beam in a single plane creating a linear or line scan at the work piece 22. Alternately if the beam 14 is in addition scanned by the galvonometer 12 in the orthogonal plane, the resulting scanned area at the work piece 22 will be a two dimensional or area scan. An example of a single beam scanned in an orthogonal direction to the illustrate scan plane, beam 16''' is deflected downwardly a small amount causing a corresponding shift of beams 18''' and 19''', creating an area scan rather than a linear scan. Beam 21''' will be correspondingly displaced. This area scan is only possible for displacements of beam 18''' which fall onto beam splitter 20.

In addition to the previously mentioned embodiment, the lens system is capable of scanning in two dimensions as opposed to a linear scan with the same accuracies as noted.

It will be appreciated that the lens elements L1-L7 may be coated with an anti-reflection coating selected for the wavelength range within which the lens 10 will be operating. Coatings may be selected from commercially available lens coatings for a selected range of wavelengths.

While a specific embodiment of the invention has been disclosed, it should be recognized that modifications and alterations may be made without departing from the scope of the claims to follow.

What is claimed is:

1. A color corrected, diffraction limited, telecentric f-theta lens comprising, in succession from the incident side:
   a first meniscus lens concave to the incident side;
   a first bi-concave lens;
   a second meniscus lens convex to the incident side;
   a third meniscus lens concave to the incident side;
   a first bi-convex lenses; a second bi-convex lens and a second bi-concave lens;
   a first plane parallel surface glass plate.

2. The color corrected telecentric lens of claim 1, further comprising air spaces between all adjacent lens surfaces.

3. The color corrected telecentric lens of claim 1 wherein spacing between said first bi-convex lens, second meniscus lens and third meniscus lens is determined by edge contact between said first bi-convex lens, second meniscus lens and third meniscus lens.

4. The color corrected telecentric lens of claim 1 wherein spacing between said second bi-concave lens and second said bi-convex lens is determined by edge contact between said bi-concave lens and said bi-convex lens.

5. The color corrected telecentric lens of claim 1, wherein said individual lenses are coated with an anti-reflection coating.

6. The color corrected telecentric lens of claim 1, wherein said lenses are enclosed in a housing comprised of stainless steel.

7. A color corrected telecentric lens comprising:
   seven air spaced lens elements with numerical characteristics substantially as follows:

| LENS # | SURFACE # | RADIUS-MM | SEPN-MM | CLR. DIAM.-MM |
|---|---|---|---|---|
| L1 | S1 | −98.600 | | 90.00 |
| | | | 20.000 | |
| | S2 | −173.440 | | 120.00 |
| | | | 0.500 | |
| L2 | S3 | −4068.600 | | 180.00 |
| | | | 15.000 | |
| | S4 | 442.180 | | 160.00 |
| | | | 6.000 | |
| L3 | S5 | 2384.400 | | 180.00 |
| | | | 22.000 | |
| | S6 | 315.700 | | 137.70 |
| | | | 10.000 | |
| L4 | S7 | −989.380 | | 137.70 |
| | | | 30.000 | |
| | S8 | −233.540 | | 180.00 |
| | | | 2.500 | |
| L5 | S9 | 282.210 | | 180.00 |
| | | | 40.000 | |
| | S10 | −233.540 | | 180.00 |
| | | | 21.690 | |
| L6 | S11 | 289.870 | | 180.00 |
| | | | 40.000 | |
| | S12 | −289.870 | | 180.00 |
| | | | 2.500 | |
| L7 | S13 | −233.540 | | 150.00 |
| | | | 20.000 | |
| | S14 | 205.980 | | 150.00 |

Said above lens elements arranged as indicated at least one optical element of BK7 glass having parallel surfaces disposed to provide a total element glass thickness of 40 mm whereby said telecentric lens possesses the following characteristics:
   Effective Focal Length 250 mm;
   Color Corrected For Wavelengths in the range encompassing 532, 514.5 and 488 nm;
   Telecentricity < 6 minutes of arc;
   Numerical Aperature = 0.05 or = F/10;
   Color Magnification Difference:
      <3 microns deviation between the relative spot locations on the image plane for spots of Argon Blue and frequency doubled YAG light;

<5 microns deviation between the relative spot locations on the image plane for spots of Argon Green and frequency doubled YAG light;
Calibrated Focal Length 248.948 mm;
Total Scan Length 100 nm;
Scan Angle = ±11.5 degrees;
Diffraction Limited Image Quality Over the Scan Angle and Wavelength Range;
wherein:
said lens number designates the lens element progressing sequentially from the incident side;
surface number designates surfaces of the lens elements progressing sequentially from the incident side;
SEPN is the separation distance from one surface Sn to Sn+1 and the CLR DIAM is the clear diameter of the lens at the corresponding surface.

8. The color corrected telecentric lens of claim 7 further including a beam splitter formed of at least an optical element having at least one pair of parallel surfaces disposed to provide a total element thickness of 40 mm, disposed intermediate said lens element L7 and an image plane of said lens.

9. The color corrected telecentric lens of claim 7 comprising said seven air spaced lens elements and said parallel plate beam splitter of 40 mm total glass thickness, said lens elements being fabricated of glasses as follows:
lens L1 of a glass designated F5;
lens L2 of a glass designated PSK52;
lens L3 of a glass designated BaF4;
lenses L4, L5 and L6 of a glass designated LaK8;
lens L7 of a glass designated SF1; and
beam splitter of a glass designated BK7.

10. The lens of claim 8 wherein said parallel surface beam splitter comprises at least two elements cemented together forming said beam splitter.

11. The color corrected telecentric lens of claim 8 wherein said individual lens elements are coated with an anti-reflection coating.

12. The lens of claim 8 enclosed in a housing comprised of stainless steel.

13. A method of focusing at least a pair of light beams onto at least a pair of image planes, comprising the steps of:
providing a beam of light comprised of at least two beams of light of different wavelengths, one of said wavelengths being useable for performing removal of material from a work piece forming one of said pair of image planes;
providing a lens assembly having an axis and including a first meniscus lens concave to the incident side, a first bi-concave lens, a second meniscus lens coves to the incident side, a third meniscus lens concave to the incident side, a first bi-convex lens, a second bi-convex lens and a second bi-concave lens;
deflecting said beam onto a plurality of points along a line extending across said first meniscus lens passing said beam through all of said lenses;
providing a beam splitter intermediate said assembly and said image planes;
impinging said beam onto said beam splitter;
splitting said beam into at least two beams, a first of said beams being of light of one of said wavelengths and a second one of said beams being of light of another of said wavelengths; and impinging each of said beams onto a separate image plane,
whereby, said light beams impinge said image planes substantially perpendicular to said image planes, without regard to the extent of the said deflection of said beam from said lens assembly axis.

14. The method of claim 13 wherein said steps of providing a lens assembly includes providing said lenses where said lenses, in order, meet the following requirements:

| LENS # | SURFACE # | RADIUS-MM | SEPN-MM | CLR. DIAM.-MM |
|---|---|---|---|---|
| L1 | S1 | −98.600 | | 90.00 |
|  |  |  | 20.000 |  |
|  | S2 | −173.440 | | 120.00 |
|  |  |  | 0.500 |  |
| L2 | S3 | −4068.600 | | 180.00 |
|  |  |  | 15.000 |  |
|  | S4 | 442.180 | | 160.00 |
|  |  |  | 6.000 |  |
| L3 | S5 | 2384.400 | | 180.00 |
|  |  |  | 22.000 |  |
|  | S6 | 315.700 | | 137.70 |
|  |  |  | 10.000 |  |
| L4 | S7 | −989.380 | | 137.70 |
|  |  |  | 30.000 |  |
|  | S8 | −233.540 | | 180.00 |
|  |  |  | 2.500 |  |
| L5 | S9 | 282.210 | | 180.00 |
|  |  |  | 40.000 |  |
|  | S10 | −233.540 | | 180.00 |
|  |  |  | 21.690 |  |
| L6 | S11 | 289.870 | | 180.00 |
|  |  |  | 40.000 |  |
|  | S12 | −289.870 | | 180.00 |
|  |  |  | 2.500 |  |
| L7 | S13 | −233.540 | | 150.00 |
|  |  |  | 20.000 |  |
|  | S14 | 205.980 | | 150.00 |

Said above lens elements arranged as indicated at least one
wherein:
said lens number designates the lens element progressing sequentially from the incident side;
surface number designates surfaces of the lens elements progressing sequentially from the incident side;
SEPN is the separation distance from one surface Sn to Sn+1 and the CLR DIAM is the clear diameter of the lens at the corresponding surface.

15. The method of claim 13, wherein said individual lenses are coated with an anti-reflection coating.

16. The method of claim 13, wherein said lenses are enclosed in a housing comprised of stainless steel.

* * * * *